UNITED STATES PATENT OFFICE.

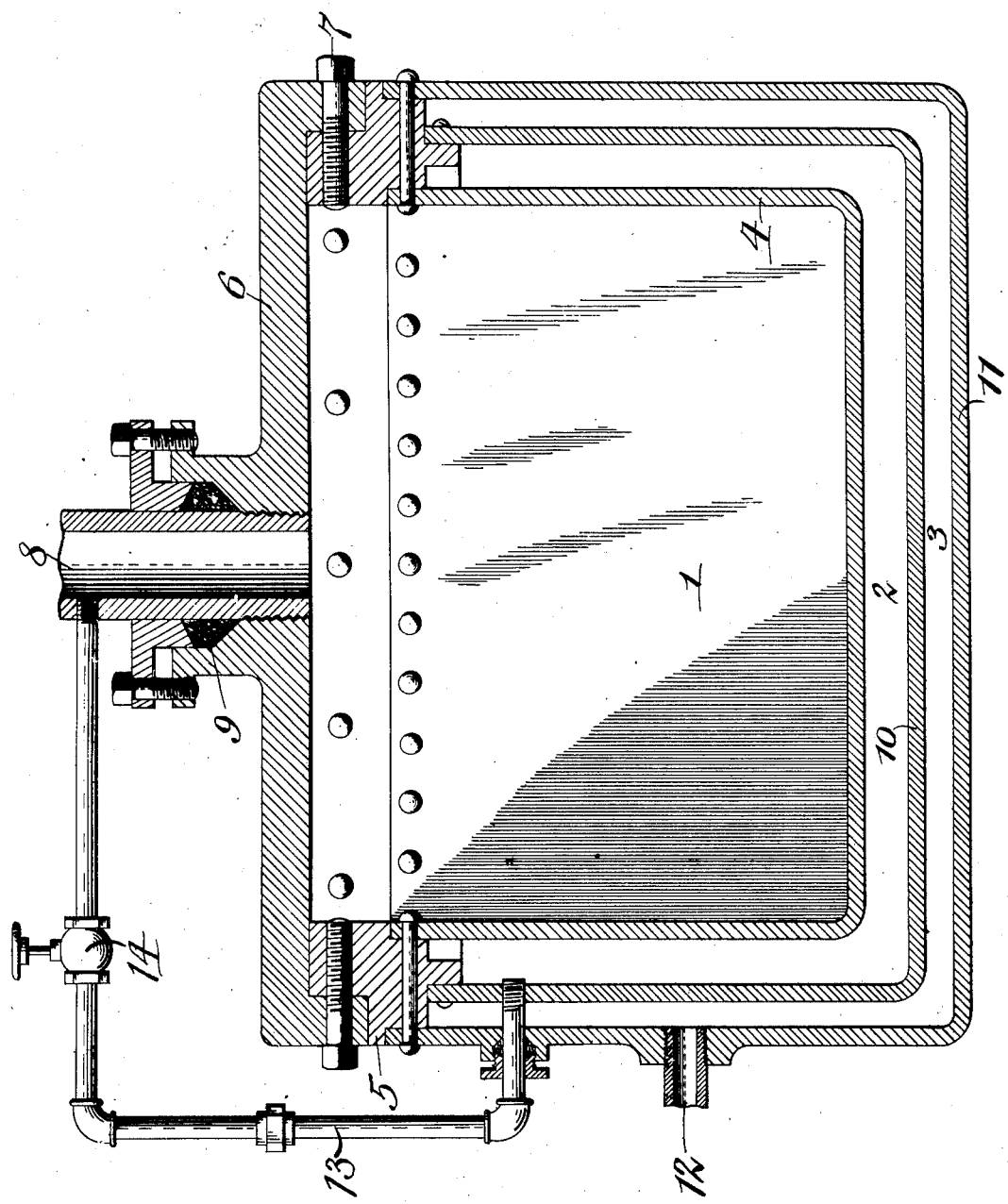

WILLIAM CHARLES SIVERSON, OF BUFFALO, NEW YORK.

APPARATUS FOR IMPREGNATING FABRIC WITH RUBBER.

1,025,321.	Specification of Letters Patent.	Patented May 7, 1912.

Application filed July 3, 1911. Serial No. 636,669.

*To all whom it may concern:*

Be it known that I, WILLIAM CHARLES SIVERSON, a citizen of the United States, and residing at Buffalo, in the county of Erie and State of New York, have invented new and useful Improvements in Method of and Apparatus for Impregnating Fabric with Rubber, of which the following is a specification.

This invention relates to a method of and apparatus for impregnating fabric such as woven webbing with plastic rubber for producing what is known as rubber belting.

In the methods heretofore employed for this purpose the plastic rubber compound and the fabric to be impregnated with the rubber were placed in a chamber and then this chamber was subjected to internal pressure and external heat. This prior method is expensive inasmuch as a considerable part of the plastic rubber during the operation of impregnating the fabric is vulcanized by reason of the heat which is applied directly to the outer side of the impregnating chamber, this vulcanized rubber forming a hardened mass next to the inner side of the impregnating chamber and involving not only considerable expense in subsequently removing the same after each impregnating operation but also resulting in a considerable loss inasmuch as the rubber when thus hardened is materially reduced in value.

It is the object of this invention to provide a process and an apparatus for impregnating fabric and similar porous material with plastic rubber to its maximum capacity and insure the production of a flexible and superior product without hardening a considerable portion of the rubber next to the inner side of the impregnating chamber.

The figure in the accompanying drawing represents a vertical section of an apparatus which embodies my invention and whereby my improved process may be practiced.

The apparatus for carrying out my invention may be variously constructed but that shown in the drawing is suitable and comprises an inner impregnating chamber 1 adapted to receive the plastic mass of unvulcanized rubber compound and the woven fabric or other porous article which is to be filled or impregnated with the rubber, an intermediate cushioning chamber or jacket 2 arranged on the outer side of the impregnating chamber, and a heating jacket or chamber 3 arranged on the outer side of the cushion jacket or chamber.

The impregnating chamber is preferably constructed of a sheet metal shell 4 of cup-shaped form having its side walls and bottom made in one piece, a metal rim 5 secured to the outer side of the body at the upper edge thereof, and a metal cover 6 detachably secured by bolts 7 or otherwise to the rim so as to permit of opening and closing the impregnating chamber for introducing the materials to be treated into the impregnating chamber and removing the same therefrom. After the fabric and the plastic rubber have been placed within the impregnating chamber and the cover has been secured to the top thereof, an internal pressure is produced in this chamber for forcing the rubber compound into the pores or interstices of the fabric or article which is to be filled or impregnated. For this purpose air or its equivalent medium under pressure may be introduced into the impregnating chamber by means of a supply or pressure pipe 8 which passes through a stuffing box 9 in the top or cover of the impregnating chamber.

The cushion jacket is preferably formed on the outer side of the impregnating chamber by means of a cup-shaped shell 10 of metal which incloses the body of the impregnating chamber but is separated therefrom by an intervening space and is secured at its upper edge to the rim and thereby confine a body of air or similar heat insulating medium around the outer side of the impregnating chamber. The insulating chamber is preferably supplied with compressed air or equivalent medium by means of a branch pipe 13 connecting the same with the main air supply pipe 8 and provided with a hand regulating valve 14.

The heating chamber is formed by means of a cup-shaped sheet metal shell 11 surrounding the outer side of the cushion shell but separated therefrom by an intervening space and secured at its upper edge to the rim. Into this heating chamber is introduced through a pipe 12 a heating agent which preferably consists of steam although any other suitable medium may be employed for this purpose. While the fabric and plastic rubber are thus subjected to the air pressure within the impregnating chamber the same are heated by admitting steam to the heating jacket, so as to maintain the fabric and rubber compound in the best condition for intimately uniting the same. The steam of this heating jacket is, however, prevented from unduly heating the rubber within the impregnating chamber by reason of the cushion of air contained in the insulating jacket between the heating chamber and impregnating chamber, thereby preventing any appreciable vulcanization of the mass of plastic rubber in the impregnating chamber.

By means of my improved process and apparatus it is possible for the fabric to absorb a much larger quantity of the plastic mass of rubber than has been possible heretofore and a solid and intimately united product is obtained which will stretch to a limited extent and also contract upon being released. Furthermore, this process and apparatus permit of obtaining a product which has greater flexibility and enables a much denser plastic mass to be used than has been possible heretofore. The rubber compound constituting the plastic mass may be varied in its constituents to suit the particular use to which the fabric is to be put. In the case of filling or impregnating woven fabric for making rubber belting this compound may consist of rubber, resin, lead, barium sulfate and sulfur.

The pressure in the impregnating chamber, the pressure in the insulating chamber and the heat in the heating chamber may be varied according to the character of the fabric and the impregnating compound. In the manufacture of belting by impregnating fabric with rubber it is suitable to employ a pressure of seventy five pounds in the impregnating chamber, a pressure of forty five pounds in the cushion chamber, and a temperature of about 350 degrees in the heating chamber. By increasing the pressure in the cushion chamber the insulating effect of the same is increased, by reducing this pressure the insulating effect is reduced, thereby enabling the heat transmitted to the rubber to be nicely regulated by means of the valve 14, to produce the best results in accordance with the character of the compound and other conditions.

I claim as my invention:

1. An apparatus for impregnating fabric with plastic rubber comprising an impregnating chamber adapted to receive the fabric and the plastic rubber for filling the fabric and provided with means for producing pressure on the interior of the chamber, a cushion jacket arranged on the outer side of said impregnating chamber, and a heating jacket arranged on the outer side of said cushion jacket.

2. An apparatus for impregnating fabric with plastic rubber comprising an impregnating chamber provided with an inlet for admitting air under pressure into the interior of said chamber, a compressed air cushion jacket arranged on the outer side of the impregnating chamber, and a steam jacket arranged on the outer side of the air cushion jacket.

Witness my hand this 30th day of June, 1911.

WILLIAM CHARLES SIVERSON.

Witnesses:
 THEO. L. POPP,
 ANNA HEIGIS.